(12) United States Patent
Doi et al.

(10) Patent No.: US 6,444,334 B1
(45) Date of Patent: Sep. 3, 2002

(54) POLYMERIC FLUORESCENT SUBSTANCE AND POLYMER LIGHT-EMITTING DEVICE USING THE SAME

(75) Inventors: Shuji Doi; Yoshiaki Tsubata; Takahiro Ueoka, all of Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/986,551

(22) Filed: Nov. 9, 2001

(30) Foreign Application Priority Data

Nov. 10, 2000 (JP) ........................... 2000-343301
Apr. 26, 2001 (JP) ........................... 2001-129289

(51) Int. Cl.[7] .............................................. B32B 19/00
(52) U.S. Cl. ...................................................... 428/690
(58) Field of Search .......................................... 428/690

(56) References Cited

U.S. PATENT DOCUMENTS 5,807,974 A    9/1998   Kim et al.
5,876,864 A    3/1999   Kim et al.

FOREIGN PATENT DOCUMENTS

JP    0 725 120 A1    8/1996
WO    WO 99/20675 A1  4/1999

OTHER PUBLICATIONS

M. Ranger et al., "New Well–Defined Poly(2,7–fluorene) Derivatives: Photoluminescence and Base Doping", Macromolecules, American Chemical Society, vol. 30, No. 25, (1997), pp. 7686–7691 with Abstract.

M. Bernius et al., "Fluorene–based polymers–preparation and applications", Journal of Materials Science: Materials in Electronics, vol. 11, 2000, pp. 111–116.

*Primary Examiner*—Terressa M. Boykin
(74) *Attorney, Agent, or Firm*—Sughure Mion, PLLC

(57) ABSTRACT

A polymeric fluorescent substance exhibiting fluorescence in solid state and having a polystyrene-reduced number-average molecular weight of $10^3$ to $10^8$ wherein the polymeric fluorescent substance contains one or more of segments represented by the following formula (1) and one or more of repeating units represented by the following formula (2):

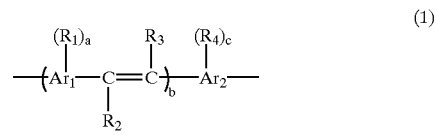

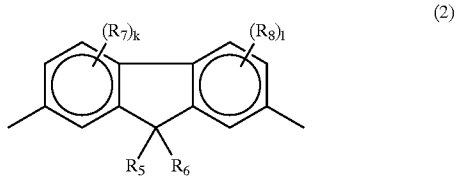

The polymeric fluorescent substance exhibits particularly strong fluorescence, and a high performance polymer LED which can be driven at low voltage and high efficiency is obtained.

43 Claims, No Drawings

US 6,444,334 B1

POLYMERIC FLUORESCENT SUBSTANCE AND POLYMER LIGHT-EMITTING DEVICE USING THE SAME

BACKGROUND OF THE INVENTION

1. Field of the Invention

The present invention relates to a polymeric fluorescent substance and more specifically a polymer light-emitting device using the same.

2. Description of Related Art

An organic electroluminescence device is an device using mainly an organic compound of lower molecular weight as a light emitting material, and there are a lot of trials reported regarding device structures, organic fluorescent dyes and organic charge transporting materials since the electroluminescence device has characteristics that it is driven at lower voltage, has higher luminance and can easily give light emission of many colors as compared with conventional inorganic electroluminescence devices [Jpn. J. Appl. Phys., 27, p. L269 (1988), J. Appl. Phys., 65, p. 3610 (1989)].

Apart from organic electroluminescence devices using mainly an organic compound having lower molecular weight, there is a polymer light emitting device (hereinafter, referred sometimes to as polymer LED) using a light emitting material having higher molecular weight (hereinafter, referred sometimes to as polymeric fluorescent substance). WO9013148, JP-A No. 3-244630, Appl. Phys. Lett., 58, p. 1982 (1991) and the like disclose polymer LEDs using a polymeric fluorescent substance, poly(p-phenylenevinylene) (hereinafter, referred to as PPV), or a derivative thereof in a light emitting layer.

Polymeric fluorescent substances and derivatives thereof have a merit that they can be dissolved in a solvent, and can form a light emitting layer by an wet film-forming method.

As the polymeric fluorescent substance used in these polymer LEDs, polyfluorene (Jpn. J. Appl. Phys., 30, p. L1941 (1991)), poly-p-phenylene derivatives (Adv. Mater., 4, p. 36 (1992)), and the like are also reported, in addition to the above-mentioned poly(p-phenylenevinylene) and derivatives thereof.

Regarding the polyfluorene derivative, J. Mater. Sci. Mater. Ele., 11, p. 111 (2000) describes copolymers composed of a fluorene repeating unit and a repeating unit of stilbene, phenylene, 1,4-naphthalene, aromatic amines and the like in which a cyano group is substituted on vinylene, and polymer LEDs using these copolymers.

An object of the present invention is to provide a polymeric fluorescent substance containing an arylene vinylene structure and a fluorene structure and manifesting strong fluorescence, and a polymer LED of high performance which can be driven at lower voltage with high efficiency, using this polymeric fluorescent substance.

SUMMARY OF THE INVENTION

The present inventors have intensively studied in view of such conditions, and resultantly found that a polymeric fluorescent substance manifesting fluorescence in solid state and having a polystyrene-reduced number-average molecular weight of $10^3$ to $10^8$ wherein the polymeric fluorescent substance contains one or more of segments represented by the following formula (1) and one or more of repeating units represented by the following formula (2) shows strong fluorescence and a polymer LED of high performance which can be driven at lower voltage with high efficiency is obtained using the above-mentioned polymeric fluorescent substance, leading to completion of the invention.

Namely, in accordance with the present invention there is provided [1] A polymeric fluorescent substance manifesting fluorescence in solid state and having a polystyrene-reduced number-average molecular weight of $10^3$ to $10^8$ wherein the polymeric fluorescent substance contains one or more of segments represented by the following formula (1) and one or more of repeating units represented by the following formula (2):

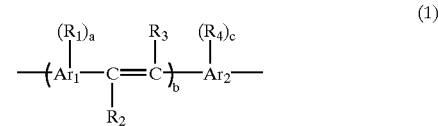

(1)

[wherein, $Ar_1$ and $Ar_2$ each independently represent an arylene group or a divalent heterocyclic compound group. $R_2$ and $R_3$ each independently represent a group selected from the group consisting of a hydrogen atom, alkyl groups, aryl groups, heterocyclic compound groups and cyano group. $R_1$ and $R_4$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, arylalkenyl groups, arylalkinyl groups, monovalent heterocyclic compound groups and cyano group. The symbols a and c each independently represent an integer of 0 to 4, and b represents an integer of 1 or more. When b is 1, a and c do not represent 0 simultaneously. When b is 2, at least one of groups $R_2$ and $R_3$ represents a group other than a hydrogen atom and cyano group. When b is 3 or more, a and c do not represent 0 simultaneously if both of $R_2$ and $R_3$ are a hydrogen atom. When a is 2 or more, a plurality of $R_4$s may be the same or different. When c is 2 or more, a plurality of $R_4$s may be the same or different. $R_1$ to $R_4$ may be connected to form a ring. Further, when $R_1$ to $R_4$ are a group containing an alkyl chain, one or more of a methyl group, methylene group and methine group constituting this alkyl chain may be substituted with a group containing a hatero atom],

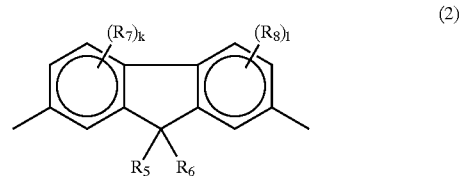

(2)

[wherein, $R_5$ and $R_6$ each independently represent a group selected from the group consisting of a hydrogen atom, alkyl groups, aryl groups and monovalent heterocyclic compound groups. $R_7$ and $R_8$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, monovalent heterocyclic compound groups and, cyano group. The symbols k and 1 each independently represent an integer of 0 to 3. When k is 2 or more, a plurality of $R_7$s may be the same or different. When l is 2 or more, a plurality of $R_8$s may be the same or different. Two or more of $R_5$ to $R_8$ may be mutually connected to form a ring. Further, when $R_5$ to $R_8$ are a group containing an alkyl chain, this alkyl chain may be interrupted with a group containing a hetero atom.] The present invention also provides [2] A polymer light emitting device comprising at least a light emitting layer between a pair of electrodes composed of an anode and a cathode at least one of which is transparent or semi-transparent wherein the light emitting layer contains a polymeric fluorescent substance according to [1].

The present invention provides a flat light source, a segment display, and a dot matrix display all obtained by using the polymer light emitting device. The present invention also provides a liquid crystal display obtained by using the polymer light emitting device as a back-light.

DETAILED DESCRIPTION OF THE PREFERRED EMBODIMENTS

The polymeric fluorescent substance of the present invention is a polymeric fluorescent substance manifesting fluorescence in solid state and having a polystyrene-reduced number-average molecular weight of $10^3$ to $10^8$ wherein the polymeric fluorescent substance contains one or more of segments represented by the formula (1) and one or more of repeating units represented by the formula (2).

When a segment represented by the formula (1) comprises repeating unit represented by the formula (3) or the formula (5), it is preferable that the total amount of repeating units represented by the formula (2) and the formula (3) or the formula (5) is 50 mol % or more based on the total amount of all repeating units and the total amount of repeating units represented by the formula (3) or the formula (5) is 0.1 mol % or more and 50 mol % or less based on the total amount of repeating units represented by the formula (2) and the formula (3) or the formula (5).

The repeating unit represented by the formula (1) is a segment comprising an arylenevinylene derivative group containing a substituent, and there are exemplified segments of the above-mentioned formula (3) or (5) and segments formed by connecting two or more of them. More specifically, there are exemplified stilbene groups having a substituent represented by the formula (4), distilbene groups having a substituent represented by the formula (6), and the like.

The repeating unit represented by the formula (2) is a fluorene group optionally having a substituent.

$R_2$ and $R_3$ in the formula (1) each independently represent a group selected from the group consisting of a hydrogen atom, alkyl groups, aryl groups, monovalent heterocyclic compound groups and cyano group.

Those in which $R_2$ and $R_3$ represent a substituent other than a hydrogen atom or cyano group are described below.

The alkyl group may be any of linear, branched or cyclic, and usually has about 1 to 20 carbon atoms, and specific examples thereof include a methyl group, ethyl group, propyl group, i-propyl group, butyl group, i-butyl group, t-butyl group, pentyl group, isoamyl group, hexyl group, cyclohexyl group, heptyl group, octyl group, 2-ethylhexyl group, nonyl group, decyl group, 3,7-dimethyloctyl group, lauryl group and the like, and preferable are a pentyl group, isoamyl group, hexyl group, octyl group, 2-ethylhexyl group, decyl group and 3,7-dimethyloctyl group.

The aryl group usually has about 6 to 60 carbon atoms, and specific examples thereof include a phenyl group, $C_1$ to $C_{12}$ alkoxyphenyl groups, $C_1$ to $C_{12}$ alkylphenyl groups, 1-naphthyl group, 2-naphthyl group and the like, and preferable are $C_1$ to $C_{12}$ alkoxyphenyl groups and $C_1$ to $C_{12}$ alkylphenyl groups.

The monovalent heterocyclic compound group usually has about 4 to 60 carbon atoms, and specific examples thereof include a thienyl group, $C_1$ to $C_{12}$ alkylthienyl groups, pyrrolyl group, furyl group, pyridyl group, $C_1$ to $C_{12}$ alkylpyridyl groups and the like, and preferable are a thienyl group, $C_1$ to $C_{12}$ alkylthienyl groups, pyridyl group and $C_1$ to $C_{12}$ alkylpyridyl groups.

$R_2$ and $R_3$ in the formula (1) may be in the relation of cis or trans.

$Ar_1$ and $Ar_2$ in the repeating unit represented by the formula (1) each independently represent an arylene group or a divalent heterocyclic group.

The arylene group is an atomic group obtained by removing two hydrogen atoms from an aromatic hydrocarbon. The aromatic hydrocarbon referred to here is a hydrocarbon used as a mother body of an aromatic compound and containing a benzene ring, and includes those having a condensed ring and those containing a dependent benzene ring or condensed ring connected directly or via a group such as vinylene and the like.

The arylene group usually has 6 to 60 carbon atoms, and specific examples thereof include a phenylene group, biphenylene group, terphenylene group, naphthalenediyl group, anthracenediyl group and the like. The carbon number of the arylene group does not include the carbon number of a substituent.

The divalent heterocyclic compound group indicates a residual atomic group obtained by removing two hydrogen atoms from a heterocyclic compound. The carbon number is usually from 4 to 60, and a furandiyl group, thienylene group, fluorenediyl group, pyridinediyl group, quinolinediyl group, quinoxalinediyl group and the like are exemplified. The carbon number of the divalent heterocyclic compound group does not include the carbon number of a substituent.

Here, examples of the heterocyclic compound includes those organic compounds having a cyclic structure in which elements constituting the ring include not only a carbon atom but also a hetero atom such as oxygen, sulfur, nitrogen, phosphorus, boron and the like.

In the formula, a and c each independently represent an integer of 0 to 4, and b represents an integer of 1 or more. When b is 1, a and c do not represent 0 simultaneously. When b is 2, at least one of groups $R_2$ and $R_3$ represents a group other than a hydrogen atom and cyano group. When b is 3 or more, a and c do not represent 0 simultaneously if both of $R_2$ and $R_3$ are a hydrogen atom. When a is 2 or more, a plurality of $R_1$s may be the same or different. When c is 2 or more, a plurality of $R_4$s may be the same or different. $R_1$ to $R_4$ may be connected to form a ring. Further, when $R_1$ to $R_4$ are a group containing an alkyl chain, one or more of a methyl group, methylene group and methine group constituting this alkyl chain may be substituted with a group containing a hetero atom.

The repeating unit represented by the formula (2) is a fluorene group optionally having a substituent.

$R_5$ and $R_6$ in the formula (2) each independently represent a group selected from the group consisting of a hydrogen atom, alkyl groups, aryl groups and monovalent heterocyclic compound groups. When $R_5$ and $R_6$ represent a substituent other than a hydrogen atom, examples thereof are the same as exemplified for $R_1$.

In the repeating unit represented by the formula (2), k and l each independently represent an integer of 0 to 3. When k is 2 or more, a plurality of $R_7$s may be the same or different. When l is 2 or more, a plurality of $R_8$s may be the same or different. Two or more of $R^5$ to $R_8$ may be mutually connected to form a ring. Further, when $R_5$ to $R_8$ are a group containing an alkyl chain, this alkyl chain may be interrupted with a group containing a hetero atom.

$R_1$ and $R_4$ in the formula (1) and $R_7$ and $R_8$ in repeating units represented by the formula (2) each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, arylalkenyl groups, arylalkinyl groups, monovalent heterocyclic compound groups and cyano group.

Those in which $R_7$ and $R_8$ represent a substituent other than cyano group are described below.

The alkyl group may be any of linear, branched or cyclic, and usually has about 1 to 20 carbon atoms, and specific examples thereof include a methyl group, ethyl group, propyl group, i-propyl group, butyl group, i-butyl group, t-butyl group, pentyl group, isoamyl group, hexyl group, cyclohexyl group, heptyl group, octyl group, 2-ethylhexyl group, nonyl group, decyl group, 3,7-dimethyloctyl group, lauryl group and the like, and preferable are a pentyl group, isoamyl group, hexyl group, octyl group, 2-ethylhexyl group, decyl group and 3,7-dimethyloctyl group.

The alkoxy group may be any of linear, branched or cyclic, and usually has about 1 to 20 carbon atoms, and specific examples thereof include a methoxy group, ethoxy group, propyloxy group, i-propyloxy group, butoxy group, i-butoxy group, t-butoxy group, pentyloxy group, isoamyloxy group, hexyloxy group, cyclohexyloxy group, heptyloxy group, octyloxy group, 2-ethylhexyloxy group, nonyloxy group, decyloxy group, 3,7-dimethyloctyloxy group, lauryloxy group and the like, and preferable are a pentyloxy group, isoamyloxy group, hexyloxy group, octyloxy group, 2-ethylhexyloxy group, decyloxy group and 3,7-dimethyloctyloxy group.

The alkylthio group may be any of linear, branched or cyclic, and usually has about 1 to 20 carbon atoms, and specific examples thereof include a methylthio group, ethylthio group, propylthio group, i-propylthio group, butylthio group, i-butylthio group, t-butylthio group, pentylthio group, isoamylthio group, hexylthio group, cyclohexylthio group, heptylthio group, octylthio group, 2-ethylhexylthio group, nonylthio group, decylthio group, 3,7-dimethyloctylthio group, laurylthio group and the like, and preferable are a pentylthio group, isoamylthio group, hexylthio group, octylthio group, 2-ethylhexylthio group, decylthio group and 3,7-dimethyloctylthio group.

The alkylsilyl group may be any of linear, branched or cyclic, and usually has about 1 to 60 carbon atoms, and specific examples thereof include a methylsilyl group, ethylsilyl group, propylsilyl group, i-propylsilyl group, butylsilyl group, i-butylsilyl group, t-butylsilyl group, pentylsilyl group, isoamylsilyl group, hexylsilyl group, cyclohexylsilyl group, heptylsilyl group, octylsilyl group, 2-ethylhexylsilyl group, nonylsilyl group, decylsilyl group, 3,7-dimethyloctylsilyl group, laurylsilyl group, trimethylsilyl group, ethyldimethylsilyl group, propyldimethylsilyl group, i-propyldimethylsilyl group, butyldimethylsilyl group, t-butyldimethylsilyl group, pentyldimethylsilyl group, isoamyldimethylsilyl group, hexyldimethylsilyl group, heptyldimethylsilyl group, octyldimethylsilyl group, 2-ethylhexyl-dimethylsilyl group, nonyldimethylsilyl group, decyldimethylsilyl group, 3,7-dimethyloctyl-dimethylsilyl group, lauryldimethylsilyl group and the like, and preferable are a pentylsilyl group, isoamylsilyl group, hexylsilyl group, octylsilyl group, 2-ethylhexylsilyl group, decylsilyl group, 3,7-dimethyloctylsilyl group, pentyldimethylsilyl group, isoamyldimethylsilyl group, hexyldimethylsilyl group, octyldimethylsilyl group, 2-ethylhexyl-dimethylsilyl group, decyldimethylsilyl group and 3,7-dimethyloctyl-dimethylsilyl group.

The alkylamino group may be any of linear, branched or cyclic, may be a monoalkyl group or a dialkylamino group, and usually has about 1 to 40 carbon atoms, and specific examples thereof include a methylamino group, dimethylamino group, ethylamino group, diethylamino group, propylamino group, i-propylamino group, butylamino group, i-butylamino group, t-butylamino group, pentylamino group, isoamylamino group, hexylamino group, cyclohexylamino group, heptylamino group, octylamino group, 2-ethylhexylamino group, nonylamino group, decylamino group, 3,7-dimethyloctylamino group, laurylamino group and the like, and preferable are a pentylamino group, isoamylamino group, hexylamino group, octylamino group, 2-ethylhexylamino group, decylamino group and 3,7-dimethyloctylamino group.

The aryl group usually has about 6 to 60 carbon atoms, and specific examples thereof include a phenyl group, $C_1$ to $C_{12}$ alkoxyphenyl groups ($C_1$ to $C_{12}$ indicates 1 to 12 carbon atoms, the same in the following), $C_1$ to $C_{12}$ alkylphenyl groups, 1-naphthyl group, 2-naphthyl group and the like, and preferable are $C_1$ to $C_{12}$ alkoxyphenyl groups and $C_1$ to $C_{12}$ alkylphenyl groups. The aryl group is an atomic group obtained by removing one hydrogen atom from an aromatic hydrocarbon.

The aryloxy group usually has about 6 to 60 carbon atoms, and specific examples thereof include a phenoxy group, $C_1$ to $C_{12}$ alkoxyphenoxy groups, $C_1$ to $C_{12}$ alkylphenoxy groups, 1-naphthyloxy group, 2-naphthyloxy group and the like, and preferable are $C_1$ to $C_{12}$ alkoxyphenoxy groups and $C_1$ to $C_{12}$ alkylphenoxy groups.

The arylsilyl group usually has about 6 to 60 carbon atoms, and specific examples thereof include a phenylsilyl group, $C_1$ to $C_{12}$ alkoxyphenylsilyl groups, $C_1$ to $C_{12}$ alkylphenylsilyl groups, 1-naphthylsilyl group, 2-naphthylsilyl group, dimethylphenylsilyl group and the like, and preferable are $C_1$ to $C_{12}$ alkoxyphenylsilyl groups and $C_1$ to $C_{12}$ alkylphenylsilyl groups.

The arylamino group usually has about 6 to 60 carbon atoms, and specific examples thereof include a phenylamino group, diphenylamino group, $C_1$ to $C_{12}$ alkoxyphenylamino groups, di($C_1$ to $C_{12}$ alkoxyphenyl) amino groups, di($C_1$ to $C_{12}$ alkylphenyl)amino groups, 1-naphthylamino group, 2-naphthylamino group, and the like, and preferable are $C_1$ to $C_{12}$ alkylphenylamino groups and di($C_1$ to $C_{12}$ alkylphenyl)amino groups.

The arylalkyl group usually has about 7 to 60 carbon atoms, and specific examples thereof include phenyl-$C_1$ to $C_{12}$ alkyl groups, $C_1$ to $C_{12}$ alkoxyphenyl-$C_1$ to $C_{12}$ alkyl groups, $C_1$ to $C_{12}$ alkylphenyl-$C_1$ to $C_{12}$ alkyl groups, 1-naphtyl-$C_1$ to $C_{12}$ alkyl groups, 2-naphtyl-$C_1$ to $C_{12}$ alkyl groups and the like, and preferable are $C_1$ to $C_{12}$ alkoxyphenyl-$C_1$ to $C_{12}$ alkyl groups and $C_1$ to $C_{12}$ alkylphenyl-$C_1$ to $C_{12}$ alkyl groups.

The arylalkoxy group usually has about 7 to 60 carbon atoms, and specific examples thereof include phenyl-$C_1$ to $C_{12}$ alkoxy groups, $C_1$ to $C_{12}$ alkoxyphenyl-$C_1$ to $C_{12}$ alkoxy groups, $C_1$ to $C_{12}$alkylphenyl-$C_1$ to $C_{12}$ alkoxy groups, 1-naphtyl-$C_1$ to $C_{12}$ alkoxy groups, 2-naphtyl-$C_1$ to $C_{12}$ alkoxy groups and the like, and preferable are $C_1$ to $C_{12}$ alkoxyphenyl-$C_1$ to $C_{12}$ alkoxy groups and $C_1$ to $C_{12}$ alkylphenyl-$C_1$ to $C_{12}$ alkoxy groups.

The arylalkylsilyl group usually has about 7 to 60 carbon atoms, and specific examples thereof include phenyl-$C_1$ to $C_{12}$ alkylsilyl groups, $C_1$ to $C_{12}$ alkoxyphenyl-$C_1$ to $C_{12}$ alkylsilyl groups, $C_1$ to $C_{12}$ alkylphenyl-$C_1$ to $C_{12}$ alkylsilyl groups, 1-naphtyl-$C_1$ to $C_{12}$ alkylsilyl groups, 2-naphtyl-$C_1$ to $C_{12}$ alikylsilyl groups, phenyl-$C_1$ to $C_{12}$ alkyldimethylsilyl groups and the like, and preferable are $C_1$ to $C_{12}$ alkoxyphenyl-$C_1$ to $C_{12}$ alkylsilyl groups and $C_1$ to $C_{12}$ alkylphenyl-$C_1$ to $C_{12}$ alkylsilyl groups.

The arylalkylamino group usually has about 7 to 60 carbon atoms, and specific examples thereof include phenyl-$C_1$ to $C_{12}$ alkylamino groups, $C_1$ to $C_{12}$ alkoxyphenyl-$C_1$ to $C_{12}$ alkylamino groups, $C_1$ to $C_{12}$ alkylphenyl-$C_1$ to $C_{12}$ alkylamino groups, di($C_1$ to $C_{12}$ alkoxyphenyl-$C_1$ to $C_{12}$ alkyl)amino groups, di($C_1$ to $C_{12}$ alkylphenyl-$C_1$ to $C_{12}$ alkyl)amino groups, 1-naphtyl-$C_1$ to $C_{12}$ alkylamino groups, 2-naphtyl-$C_1$ to $C_{12}$ alkylamino groups and the like, and preferable are $C_1$ to $C_{12}$ alkylphenyl-$C_1$ to $C_{12}$ alkylamino groups and di($C_1$ to $C_{12}$ alkylphenyl-$C_1$ to $C_{12}$ alikyl)amino groups.

The monovalent heterocyclic compound group usually has about 4 to 60 carbon atoms, and specific examples thereof include a thienyl group, $C_1$ to $C_{12}$ alkylthienyl groups, pyrrolyl group, furyl group, pyridyl group, $C_1$ to $C_{12}$ alkylpyridyl groups and the like, and preferable are a thienyl group, $C_1$ to $C_{12}$ alkylthienyl groups, pyridyl group and $C_1$ to $C_{12}$ alkylpyridyl groups. The monovalent heterocyclic compound group means a residual atomic group obtained by removing one hydrogen atom from a heterocyclic compound.

In the formula (1), when b is 1, a repeating unit represented by the following formula (3) is formed.

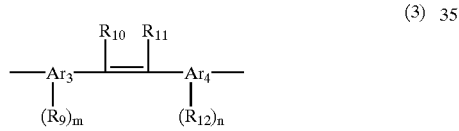

(3)

$Ar_3$ and $Ar_4$ in the repeating unit represented by the formula (3) represent the same group as exemplified for $Ar_1$. $R_9$ and $R_{12}$ in the formula (3) represent the same group as exemplified for $R_1$. $R_{10}$ and $R_{11}$ in the formula (3) represent the same group as exemplified for $R_2$. The symbols m and n do not represent 0 simultaneously. Groups $R_{10}$ and $R_{11}$ in the formula (3) may be in the relation of cis or trans.

Specifically, stilbene groups represented by the following formula (4) are exemplified.

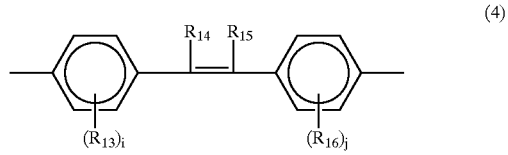

(4)

$R_{13}$ and $R_{16}$ in the formula (4) represent the same group as exemplified for $R_1$. $R_{14}$ and R15 in the formula (4) represent the same group as exemplified for $R_2$. i and j each independently represent an integer of 0 to 4. i and j do not represent 0 simultaneously. Groups $R_{14}$ and $R_{15}$ in the formula (4) may be in the relation of cis or trans.

In the formula (1), when b is 2, a repeating unit represented by the following formula (5) is formed.

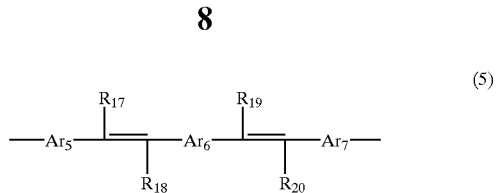

(5)

$Ar_5$, $Ar_6$ and $Ar_7$ in the repeating unit represented by the formula (5) represent the same group as exemplified for $Ar_1$. $R_{17}$, $R_{18}$, $R_{19}$ and $R_{20}$ in the formula (5) represent the same group as exemplified for $R_2$. One or more of $R_{17}$, $R_{18}$, $R_{19}$ and $R_{20}$ represent a group other than a hydrogen atom and cyano group. Two or more of $R_{17}$ to $R_{20}$ may be mutually connected to form a ring. Further, when $R_{17}$ to $R_{20}$ are a group containing an alkyl chain, this alkyl chain may be interrupted with a group containing a hetero atom. Groups $R_{17}$ and $R_{18}$ in the formula (5) may be in the relation of cis or trans, and groups $R_{19}$ and $R_{20}$ may also be in the relation of cis or trans.

Specifically, distilbene groups having a substituent on a vinylene group represented by the following formula (6) are exemplified.

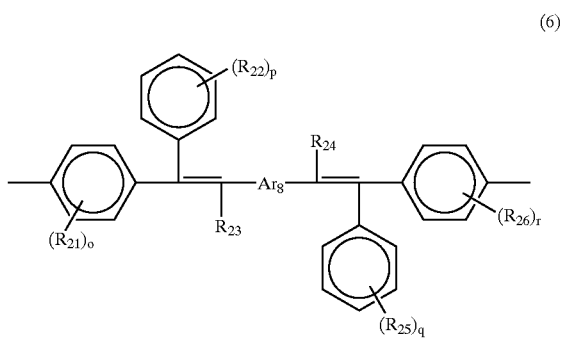

(6)

$Ar_8$ in the repeating unit represented by the formula (6) represents the same group as exemplified for $Ar_1$. $R_{21}$, $R_{22}$, $R_{25}$ and $R_{26}$ in the formula (6) represent the same group as exemplified for $R_1$. $R_{23}$ and $R_{24}$ in the formula (6) represent the same group as exemplified for $R_2$. The symbols o and r each independently represent an integer of 0 to 4, and p and q each independently represent an integer of 0 to 5. When o is 2 or more, a plurality of $R_{21}$s may be the same or different. When p is 2 or more, a plurality of $R_{32}$s may be the same or different. When q is 2 or more, a plurality of $R_{25}$s may be the same or different. When r is 2 or more, a plurality of $R_{26}$s may be the same or different. Two or more of $R_{21}$ to $R_{26}$ may be connected to form a ring. Further, when $R_{21}$ to $R_{26}$ are a group containing an alkyl chain, this alkyl chain may be interrupted with a group containing a hetero atom.

$R_{23}$ in the formula (6) and a group represented by the following formula:

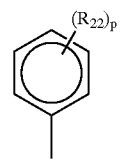

may be in the relation of cis or trans, and $R_{24}$ and a group represented by the following formula:

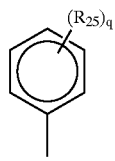

may also be in the relation of cis or trans.

In the repeating unit represented by the formula (2), k and l each independently represent an integer of 0 to 3. When k is 2 or more, a plurality of $R_7$s may be the same or different. When l is 2 or more, a plurality of $R_8$s may be the same or different. Two or more of $R_5$ to $R_8$ may be connected to form a ring. Further, when $R_5$ to $R_8$ are a group containing an alkyl chain, this alkyl chain may be interrupted with a group containing a hetero atom.

In the repeating unit represented by the formula (3), i and l each independently represent an integer of 0 to 4, and j and k each independently represent an integer of 0 to 5. When i is 2 or more, a plurality of $R_9$s may be the same or different. When j is 2 or more, a plurality of $R_{12}$s may be the same or different. When k is 2 or more, a plurality of $R_{13}$s may be the same or different. When l is 2 or more, a plurality of $R_{16}$s may be the same or different. Two or more of $R_9$ to $R_{14}$ may be connected to form a ring. Further, when $R_9$ to $R_{14}$ are a group containing an alkyl chain, this alkyl chain may be interrupted with a group containing a hetero atom.

Here, as the hetero atom, an oxygen atom, sulfur atom, nitrogen atom and the like are exemplified.

As the group containing a hetero atom, the following groups are exemplified.

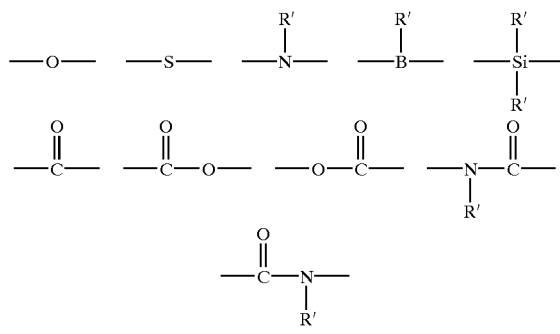

Here, as R', a hydrogen atom, alkyl groups having 1 to 20 carbon atoms, aryl groups having 6 to 60 carbon atoms, and monovalent heterocyclic compound groups having 4 to 60 carbon atoms are exemplified.

Substituents containing an alkyl group may be linear, branched or cyclic, or a combination thereof, and when not linear, there are exemplified an isoamyl group, 2-ethylhexyl group, 3,7-dimethyloctyl group, cyclohexyl group, 4-$C_1$ to $C_{12}$ alkylcyclohexyl group and the like. It is preferable that one or more of substituents of the formula (1) contain a cyclic or branched alkyl chain, for enhancing solubility of a polymeric fluorescent substance into a solvent.

It is preferable that the form of a repeating unit including a substituent has little symmetric property, for obtaining a material showing strong fluorescence.

Further, when $R_1$ and $R_2$ contain an aryl group and/or a heterocyclic compound group as a part of their structure, the aryl group and/or heterocyclic compound group may further have one or more substituents.

Furthermore, the end group of a polymeric fluorescent substance may also be protected with a stable group since if alpolymerization active group remains intact, there is a possibility of reduction in light emitting property and life when the fluorescent substance is made into an device. Those having a conjugated bond continuing to a conjugated structure of the main chain are preferable, and there are exemplified structures connected to an aryl group or heterocyclic compound group via a carbon-carbon bond. Specifically, substituents of the chemical formula 10 in JP-A No. 9-45478 and the like are exemplified.

As the method of synthesizing the polymeric fluorescent substance, there are exemplified a method in which polymerization is effected according to a Suzuki coupling reaction from the corresponding monomer, a method in which polymerization is effected according to a Grignard reaction, a method in which polymerization is effected using a Ni(0) catalyst, a method in which polymerization is effected using an oxidizing agent such as $FeCl_3$ and the like, a method of effecting oxidation polymerization electrochemically, a method according to decomposition of an intermediate polymer having a suitable releasing group, and the like. Of them, the method of effecting polymerization according to a Suzuki coupling reaction, the method of effecting polymerization according to a Grignard reaction, the method of effecting polymerization using a Ni(0) catalyst are preferable since reaction control is easy.

The polymeric fluorescent substance may contain a repeating unit other than repeating units represented by the formula (1) or (2), in an amount which does not deteriorate fluorescent property and charge carrying property. Further, repeating units represented by the formula (1) or (2) and other repeating units may be connected with a non-conjugation unit, or such anon-conjugation part may be contained in the repeating unit. As the bonding structure, there are exemplified those illustrated below, those obtained by combining those illustrated below with a vinylene group, those obtained by combining two or more of those illustrated below, and the like. Here, R represents a group selected from the group consisting of a hydrogen atom, alkyl groups having 1 to 20 carbon atom, aryl groups having 6 to 60 carbon atoms and heterocyclic compound groups having 4 to 60 carbon atoms, and Ar represents a hydrocarbon group having 6 to 60 carbon atoms.

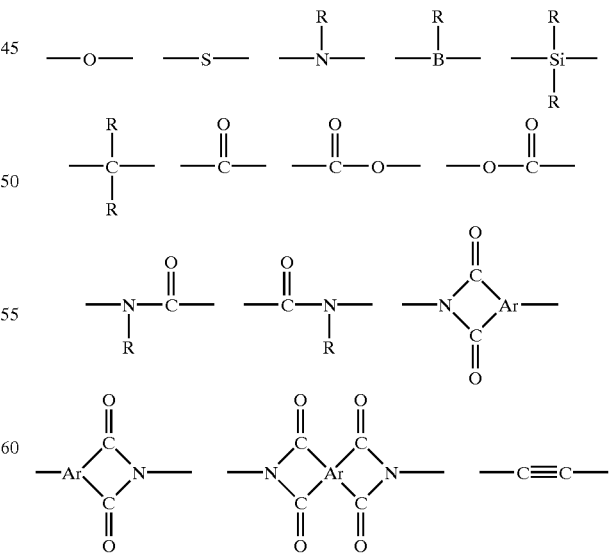

This polymeric fluorescent substance may also be a random, block or graft copolymer, or a polymer having an intermediate structure thereof, for example, a random copolymer having blocking property. From the viewpoint for obtaining a polymeric fluorescent substance having high fluorescent quantum yield, random copolymers having blocking property and block or graft copolymers are more preferable than complete random copolymers. Further, copolymers may have branched main chain and more than three terminals.

Further, as the polymeric fluorescent substance, those emitting fluorescence in a solid state are suitably used, since the material utilizes light emission from a thin film.

As good solvents for the polymeric fluorescent substance, there are exemplified chloroform, methylene chloride, dichloroethane, tetrahydrofuran, toluene, xylene, mesitylene, tetralin, decalin, n-butylbenzene and the like. The polymeric fluorescent substance can be usually dissolved in these solvents in an amount of 0.1 wt % or more, though the amount differs depending on the structure and molecular weight of the polymeric fluorescent substance.

The polymeric fluorescent substance has a polystyrene-reduced number-average molecular weight of $5 \times 10^4$ to $1 \times 10^8$, and the degree of polymerization thereof also changes depending on repeating structures and proportion thereof. From the standpoint of film forming property, generally the total amount of repeating structures is preferably from 20 to 10000, more preferably from 30 to 10000, particularly preferably from 50 to 5000.

When these polymeric fluorescent substances are used as a light emitting material of a polymer LED, the purity thereof exerts an influence on light emitting property, therefore, it is, preferable that a monomer before polymerization is purified by a method such as distillation, sublimation purification, re-crystallization and the like before being polymerized and further, it is preferable to conduct a purification treatment such as re-precipitation purification, chromatographic separation and the like after the synthesis.

The polymeric fluorescent substance of the present invention can be used not only as a light emitting material, but also as an organic semiconductor material, optical material, or as conductive material by doping.

Next, the polymer LED of the present invention will be illustrated. The polymer LED of the present invention is a polymer LED comprising at least a light emitting layer between a pair of electrodes composed of an anode and a cathode at least one of which is transparent or semi-transparent wherein the light emitting layer contains a polymeric fluorescent substance of the present invention.

As the polymer LED of the present invention, there are listed polymer LEDs having an electron transporting layer disposed between a cathode and a light emitting layer, polymer LEDs having a hole transporting layer disposed between an anode and a light emitting layer, polymer LEDs having an electron transporting layer disposed between a cathode and a light emitting layer and having a hole transporting layer disposed between an anode and a light emitting layer.

For example, the following structures a) to d) are specifically exemplified.
a) anode/light emitting layer/cathode
b) anode/hole transporting layer/light emitting layer/cathode
c) anode/light emitting layer/electron transporting layer/cathode
d) anode/hole transporting layer/light emitting layer/electron transporting layer/cathode (wherein, / indicates adjacent lamination of layers. Hereinafter, the same)

Herein, the light emitting layer is a layer having function to emit a light, the hole transporting layer is a layer having function to transport a hole, and the electron transporting layer is a layer having function to transport an electron. Herein, the electron transporting layer and the hole transporting layer are generically called a charge transporting layer.

The light emitting layer, hole transporting layer and electron transporting layer may also each independently used in two or more layers.

Of charge transporting layers disposed adjacent to an electrode, that having function to improve charge injecting efficiency from the electrode and having effect to decrease driving voltage of an device are particularly called sometimes a charge injecting layer (hole injecting layer, electron injecting layer) in general.

For enhancing adherence with an electrode and improving charge injection from an electrode, the above-described charge injecting layer or insulation layer having a thickness of 2 nm or less may also be provided adjacent to an electrode, and further, for enhancing adherence of the interface, preventing mixing and the like, a thin buffer layer may also be inserted into the interface of a charge transporting layer and light emitting layer.

The order and number of layers laminated and the thickness of each layer can be appropriately applied while considering light emitting efficiency and life of the device.

In the present invention, as the polymer LED having a charge injecting layer (electron injecting layer, hole injecting layer) provided, there are listed a polymer LED having a charge injecting layer provided adjacent to a cathode and a polymer LED having a charge injecting layer provided adjacent to an anode.

For example, the following structures e) to p) are specifically exemplified.
e) anode/charge injecting layer/light emitting layer/cathode
f) anode/light emitting layer/charge injecting layer/cathode
g) anode/charge injecting layer/light emitting layer/charge injecting layer/cathode
h) anode/charge injecting layer/hole transporting layer/light emitting layer/cathode
i) anode/hole transporting layer/light emitting layer/charge injecting layer/cathode
j) anode/charge injecting layer/hole transporting layer/light emitting layer/charge injecting layer/cathode
k) anode/charge injecting layer/light emitting layer/electron transporting layer/cathode
l) anode/light emitting layer/electron transporting layer/charge injecting layer/cathode
m) anode/charge injecting layer/light emitting layer/electron transporting layer/charge injecting layer/cathode
n) anode/charge injecting layer/hole transporting layer/light emitting layer/electron transporting layer/cathode
o) anode/hole transporting layer/light emitting layer/electron transporting layer/charge injecting layer/cathode
p) anode/charge injecting layer/hole transporting layer/light emitting layer/electron transporting layer/charge injecting layer/cathode As the specific examples of the charge injecting layer, there are exemplified layers containing an conducting polymer, layers which are disposed between an anode and a hole transporting layer and contain a material having an ionization potential between the ionization potential of an anode material and the ionization potential of a hole transporting material contained in the hole transporting layer, layers which are disposed between a cathode and an electron transporting layer and contain a material having an electron affinity between the electron affinity of a cathode material and the electron affinity of an electron transporting material contained in the electron transporting layer, and the like.

When the above-described charge injecting layer is a layer containing an conducting polymer, the electric conductivity of the conducting polymer is preferably $10^{-5}$ S/cm or more and $10^3$ S/cm or less, and for decreasing the leak current between light emitting pixels, more preferably $10^{-5}$ S/cm or more and $10^2$ S/cm or less, further preferably $10^{-5}$ S/cm or more and $10^1$ S/cm or less.

Usually, to provide an electric conductivity of the conducting polymer of $10^{-5}$ S/cm or more and $10^3$ S/cm or less, a suitable amount of ions are doped into the conducting polymer.

Regarding the kind of an ion doped, an anion is used in a hole injecting layer and a cation is used in an electron injecting layer. As examples of the anion, a polystyrene sulfonate ion, alkylbenzene sulfonate ion, camphor sulfonate ion and the like are exemplified, and as examples of the cation, a lithium ion, sodium ion, potassium ion, tetrabutyl ammonium ion and the like are exemplified.

The thickness of the charge injecting layer is for example, from 1 nm to 100 nm, preferably from 2 nm to 50 nm.

Materials used in the charge injecting layer may properly be selected in view of relation with the materials of electrode and adjacent layers, and there are exemplified conducting polymers such as polyaniline and derivatives thereof, plythiophene and derivatives thereof, polypyrrole and derivatives thereof, poly(phenylene vinylene) and derivatives thereof, poly(thienylene vinylene) and derivatives thereof, polyquinoline and derivatives thereof, polyquinoxaline and derivatives thereof, polymers containing aromatic amine structures in the main chain or the side chain, and the like, and metal phthalocyanine (copper phthalocyanine and the like), carbon and the like.

The insulation layer having a thickness of 2 nm or less has function to make charge injection easy. As the material of the above-described insulation layer, metal fluoride, metal oxide, organic insulation materials and the like are listed. As the polymer LED having an insulation layer having a thickness of 2 nm or less, there are listed polymer LED shaving an insulation layer having a thickness of 2 nm or less provided adjacent to a cathode, and polymer LEDs having an insulation layer having a thickness of 2 nm or less provided adjacent to an anode.

Specifically, there are listed the following structures q) to ab) for example.

q) anode/insulation layer having a thickness of 2 nm or less/light emitting layer/cathode
r) anode/light emitting layer/insulation layer having a thickness of 2 nm or less/cathode
s) anode/insulation layer having a thickness of 2 nm or less/light emitting layer/insulation layer having a thickness of 2 nm or less/cathode
t) anode/insulation layer having a thickness of 2 nm or less/hole transporting layer/light emitting layer/cathode
u) anode/hole transporting layer/light emitting layer/ insulation layer having a thickness of 2nm or less/ cathode
v) anode/insulation layer having a thickness of 2 nm or less/hole transporting layer/light emitting layer/ insulation layer having a thickness of 2 nm or less/ cathode
w) anode/insulation layer having a thickness of 2 nm or less/light emitting layer/electron transporting layer/ cathode
x) anode/light emitting layer/electron transporting layer/ insulation layer having a thickness of 2nm or less/ cathode
y) anode/insulation layer having a thickness of 2 nm or less/light emitting layer/electron transporting layer/ insulation layer having a thickness of 2nm or less/ cathode
z) anode/insulation layer having a thickness of 2 nm or less/hole transporting layer/light emitting layer/ electron transporting layer/cathode
aa) anode/hole transporting layer/light emitting layer/ electron transporting layer/insulation layer having a thickness of 2 nm or less/cathode
ab) anode/insulation layer having a thickness of 2 nm or less/hole transporting layer/light emitting layer/ electron transporting layer/insulation layer having a thickness of 2 nm or less/cathode In producing a polymer LED, when a film is formed from a solution by using such polymeric fluorescent substance soluble in an organic solvent, only required is removal of the solvent by drying after coating of this solution, and even in the case of mixing of a charge transporting material and a light emitting material, the same method can be applied, causing an extreme advantage in production. As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

Regarding the thickness of the light emitting layer, the optimum value differs depending on material used, and may properly be selected so that the driving voltage and the light emitting efficiency become optimum values, and for example, it is from 1 nm to 1 $\mu$m, preferably from 2 nm to 500 nm, further preferably from 5 nm to 200 nm.

In the polymer LED of the present invention, a light emitting material other than the above-mentioned polymeric fluorescent substances may be mixed in a light emitting layer. Further, in the polymer LED according to the instant application, a light emitting layer containing a light emitting material other than the above-mentioned polymeric fluorescent substance may be laminated with a light emitting layer containing the above-mentioned polymeric fluorescent substance.

As the light emitting material, known materials can be used. In a compound having lower molecular weight, there can be used, for example, naphthalene derivatives, anthracene or derivatives thereof, perylene or derivatives thereof; dyes such as polymethine dyes, xanthene dyes, coumarine dyes, cyanine dyes; metal complexes of 8-hydroxyquinoline or derivatives thereof, aromatic amine, tetraphenylcyclopentane or derivatives thereof, or tetraphenylbutadiene or derivatives thereof, and the like.

Specifically, there can be used known compounds such as those described in JP-A Nos. 57-51781, 59-195393 and the like, for example.

When the polymer LED of the present invention has a hole transporting layer, as the hole transporting materials used, there are exemplified polyvinylcarbazole or derivatives thereof, polysilane or derivatives thereof, polysiloxane derivatives having an aromatic amine in the side chain or the main chain, pyrazoline derivatives, arylamine derivatives, stilbene derivatives, triphenyldiamine derivatives, polyaniline or derivatives thereof, polythiophene or derivatives thereof, polypyrrole or derivatives thereof, poly(p-phenylenevinylene) or derivatives thereof, poly(2,5-thienylenevinylene) or derivatives thereof, or the like.

Specific examples of the hole transporting material include those described in JP-A Nos. 63-70257, 63-175860, 2-135359, 2-135361, 2-209988, 3-37992 and 3-152184.

Among them, as the hole transporting materials used in the hole transporting layer, preferable are polymer hole transporting materials such as polyvinylcarbazole or derivatives thereof, polysilane or derivatives thereof, polysiloxane derivatives having an aromatic amine compound group in the side chain or the main chain, polyaniline or derivatives thereof, polythiophene or derivatives thereof, poly(p-phenylenevinylene) or derivatives thereof, poly(2,5-thienylenevinylene) or derivatives thereof, or the like, and further preferable are polyvinylcarbazole or derivatives thereof, polysilane or derivatives thereof and polysiloxane derivatives having an aromatic amine compound group in the side chain or the main chain. In the case of a hole transporting material having lower molecular weight, it is preferably dispersed in a polymer binder for use.

Polyvinylcarbazole or derivatives thereof are obtained, for example, by cation polymerization or radical polymerization from a vinyl monomer.

As the polysilane or derivatives thereof, there are exemplified compounds described in Chem. Rev., 89, 1359 (1989) and GB 2300196 published specification, and the like. For synthesis, methods described in them can be used, and a Kipping method can be suitably used particularly.

As the polysiloxane or derivatives thereof, those having the structure of the above-described hole transporting material having lower molecular weight in the side chain or main chain, since the siloxane skeleton structure has poorhole transporting property. Particularly, there are exemplified those having an aromatic amine having hole transporting property in the side chain or main chain.

The method for forming a hole transporting layer is not restricted, and in the case of a hole transporting layer having lower molecular weight, a method in which the layer is formed from a mixed solution with a polymer binder is exemplified. In the case of a polymer hole transporting material, a method in which the layer is formed from a solution is exemplified.

The solvent used for the film forming from a solution is not particularly restricted providing it can dissolve a hole transporting material. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like, from a solution.

The polymer binder mixed is preferably that does not disturb charge transport extremely, and that does not have strong absorption of a visible light is suitably used. As such polymer binder, polycarbonate, polyacrylate, poly(methyl acrylate), poly(methyl methacrylate), polystyrene, poly(vinyl chloride), polysiloxane and the like are exemplified.

Regarding the thickness of the hole transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the hole transporting layer is, for example, from 1 nm to 1 $\mu$m, preferably from 2 nm to 500 nm, further preferably from 5 nm to 200 nm.

When the polymer LED of the present invention has an electron transporting layer, known compounds are used as the electron transporting materials, and there are exemplified oxadiazole derivatives, anthraquinonedimethane or derivatives thereof, benzoquinone or derivatives thereof, naphthoquinone or derivatives thereof, anthraquinone or derivatives thereof, tetracyanoanthraquinodimethane or derivatives thereof, fluorenone derivatives, diphenyldicyanoethylene or derivatives thereof, diphenoquinone derivatives, or metal complexes of 8-hydroxyquinoline or derivatives thereof, pollyquinoline and derivatives thereof, polyquinoxaline and derivatives thereof, polyfluorene or derivatives thereof, and the like.

Specifically, there are exemplified those described in JP-A Nos. 63-70257, 63-175860, 2-135359, 2-135361, 2-209988, 3-37992 and 3-152184.

Among them, oxadiazole derivatives, benzoquinone or derivatives thereof, anthraquinone or derivatives thereof, or metal complexes of 8-hydroxyquinoline or derivatives thereof, polyquinoline and derivatives thereof, polyquinoxaline and derivatives thereof, polyfluorene or derivatives thereof are preferable, and 2-(4-biphenyl)-5-(4-t-butylphenyl)-1,3,4-oxadiazole, benzoquinone, anthraquinone, tris(8-quinolinol)aluminum and polyquinoline are further preferable.

The method for forming the electron transporting layer is not particularly restricted, and in the case of an electron transporting material having lower molecular weight, a vapor deposition method from a powder, or a method of film-forming from a solution or melted state is exemplified, and in the case of a polymer electron transporting material, a method of film-forming from a solution or melted state is exemplified, respectively.

The solvent used in the film-forming from a solution is not particularly restricted provided it can dissolve electron transporting materials and/or polymer binders. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film-forming method from a solution or melted state, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

The polymer binder to be mixed is preferably that which does not extremely disturb a charge transport property, and that does not have strong absorption of a visible light is suitably used. As such polymer binder, poly(N-vinylcarbazole), polyaniline or derivatives thereof, polythiophene or derivatives thereof, poly(p-phenylene vinylene) or derivatives thereof, poly(2,5-thienylene vinylene) or derivatives thereof, polycarbonate, polyacrylate, poly(methyl acrylate), poly(methyl methacrylate), polystyrene, poly(vinyl chloride), polysiloxane and the like are exemplified.

Regarding the thickness of the electron transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the electron transporting layer is, for example, from 1 nm to 1 µm, preferably from 2 nm to 500 nm, further preferably from 5 nm to 200 nm.

The substrate forming the polymer LED of the present invention may preferably be that does not change in forming an electrode and layers of organic materials, and there are exemplified glass, plastics, polymer film, silicon substrates and the like. In the case of a opaque substrate, it is preferable that the opposite electrode is transparent or semitransparent.

In the present invention, it is preferable that an anode is transparent or semitransparent, and as the material of this anode, electron conductive metal oxide films, semitransparent metal thin films and the like are used. Specifically, there are used indium oxide, zinc oxide, tin oxide, and films (NESA and the like) fabricated by using an electron conductive glass composed of indium.tin.oxide (ITO), indium.zinc.oxide and the like, which are metal oxide complexes, and gold, platinum, silver, copper and the like are used, and among them, ITO, indium.zinc.oxide, tin oxide are preferable. As the fabricating method, a vacuum vapor deposition method, sputtering method, ion plating method, plating method and the like are used. As the anode, there may also be used organic transparent conducting films such as polyaniline or derivatives thereof, polythiophene or derivatives thereof and the like.

The thickness of the anode can be appropriately selected while considering transmission of a light and electric conductivity, and for example, from 10 nm to 10 µm, preferably from 20 nm to 1 µm, further preferably from 50 nm to 500 nm.

Further, for easy charge injection, there may be provided on the anode a layer comprising a phthalocyanine derivative conducting polymers, carbon and the like, or a layer having an average film thickness of 2 nm or less comprising a metal oxide, metal fluoride, organic insulating material and the like.

As the material of a cathode used in the polymer LED of the present invention, that having lower work function is preferable. For example, there are used metals such as lithium, sodium, potassium, rubidium, cesium, beryllium, magnesium, calcium, strontium, barium, aluminum, scandium, vanadium, zinc, yttrium, indium, cerium, samarium, europium, terbium, ytterbium and the like, or alloys comprising two of more of them, or alloys comprising one or more of them with one or more of gold, silver, platinum, copper, manganese, titanium, cobalt, nickel, tungsten and tin, graphite and graphite intercalation compounds and the like. Examples of alloys include a magnesium-silver alloy, magnesium-indium alloy, magnesium-aluminum alloy, indium-silver alloy, lithium-aluminum alloy, lithium-magnesium alloy, lithium-indium alloy, calcium-aluminum alloy and the like. The cathode may be formed into a laminated structure of two or more layers.

The film thickness of a cathode can be appropriately selected in view of electric conductivity and durability, and for example, it is from 10 nm to 10 µm, preferably from 20 nm to 1 µm, further preferably from 50 nm to 500 nm.

As the method for fabricating a cathode, there are used a vacuum vapor deposition method, sputtering method, lamination method in which a metal thin film is adhered under heat and pressure, and the like. Further, there may also be provided, between a cathode and an organic layer, a layer comprising an conducting polymer, or a layer having an average film thickness of 2 nm or less comprising a metal oxide, metal fluoride, organic insulation material and the like, and after fabrication of the cathode, a protective layer may also be provided which protects the polymer LED. For stable use of the polymer LED for a long period of time, it is preferable to provide a protective layer and/or protective cover for protection of the device in order to prevent it from outside damage.

As the protective layer, there can be used a polymer compound, metal oxide, metal fluoride, metal borate and the like. As the protective cover, there can be used a glass plate, a plastic plate the surface of which has been subjected to lower-water-permeation treatment, and the like, and there is suitably used a method in which the cover is pasted with an device substrate by a thermosetting resin or light-curing resin for sealing. If space is maintained using a spacer, it is easy to prevent an device from being injured. If an inner gas such as nitrogen and argon is sealed in this space, it is possible to prevent oxidation of a cathode, and further, by placing a desiccant such as barium oxide and the like in the above-described space, it is easy to suppress the damage of an device by moisture adhered in the production process. Among them, any one means or more are preferably adopted.

For obtaining light emission in plane form using the polymer LED of the present invention, an anode and a cathode in the plane form may properly be placed so that they are laminated each other. Further, for obtaining light emission in pattern form, there are a method in which a mask with a window in pattern form is placed on the above-described plane light emitting device, a method in which an organic layer in non-light emission part is formed to obtain extremely large thickness providing substantial non-light emission, and a method in which any one of an anode or a cathode, or both of them are formed in the pattern. By forming a pattern by any of these methods and by placing some electrodes so that independent on/off is possible, there is obtained a display device of segment type which can display digits, letters, simple marks and the like. Further, for forming a dot matrix device, it may be advantageous that anodes and cathodes are made in the form of stripes and placed so that they cross at right angles. By a method in which a plurality of kinds of polymeric fluorescent substances emitting different colors of lights are placed separately or a method in which a color filter or luminescence converting filter is used, area color displays and multi color displays are obtained. A dot matrix display can be driven by passive driving, or by active driving combined with TFT and the like. These display devices can be used as a display of a computer, television, portable terminal, portable telephone, car navigation, view finder of a video camera, and the like.

Further, the above-described light emitting device in plane form is a thin self-light- emitting one, and can be suitably used as a flat light source for back-light of a liquid crystal display, or as a flat light source for illumination. Further, if a flexible plate is used, it can also be used as a curved light source or a display.

EXAMPLES

The following examples further illustrate the present invention in detail but do not limit the scope thereof.

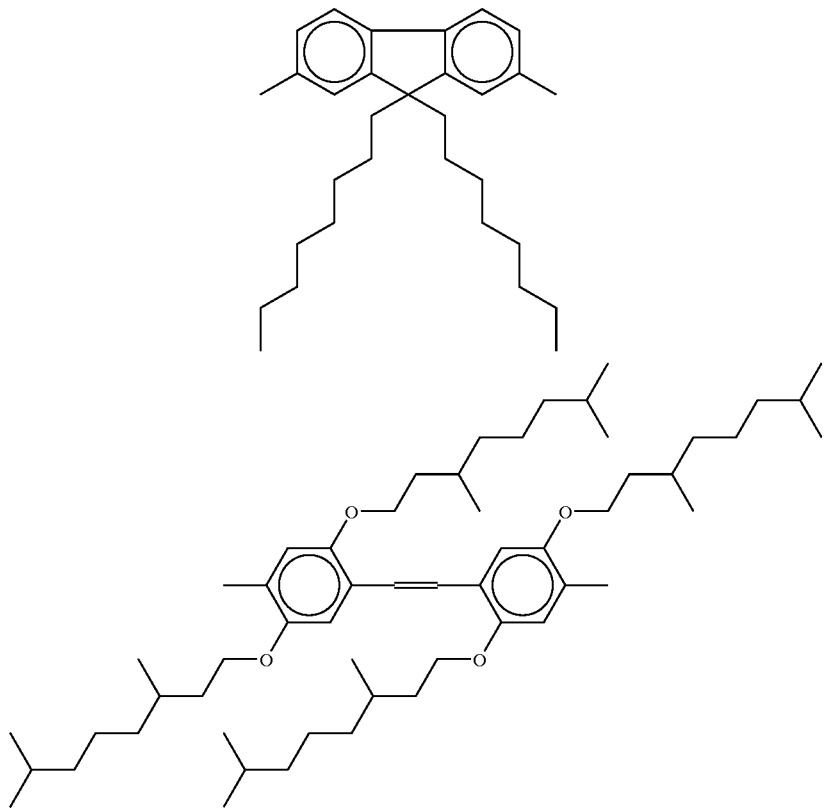

(7)

Herein, regarding the number average molecular weight, a polystyrene reduced number-average molecular weight was measured by gel permeation chromatography (GPC) using chloroform as a solvent.

Example 1

Synthesis of Polymeric Fluorescent Substance 1

Under an inert atmosphere, 9,9-dioctylfluorene-2,7-bis (ethyleneboronate) (317 mg, 0.598 mmol), 2,7-dibromo-9,9-dioctylfluorene (250 mg, 0.456 mmol), 4,4'-dibromo-2,2',5,5'-tetrakis(2,7-dimethyloctyloxy)stilb ene (110 mg, 0.114 mmol) and aliquat® 336 (tricaprylylmethylammonium chloride, manufactured by Aldrich, 220 mg, 0.547 mmol) were dissolved in toluene (10 ml) and to this was added 10 ml of an aqueous solution of potassium carbonate (295 mg, 2.14 mmol). Further, tetrakis(triphenylphosphine)palladium (20 mg, 0.018 mmol) was added, and the mixture was heated under reflux for 20 hours. After cooling, the solution was separated, and the organic layer was washed with water.

This organic layer was dropped into methanol, and the deposited precipitate was filtrated off. The precipitate was purified by silica gel chromatography (toluene), to obtain poly(9,9-dioctylfluorene-2,7-diyl-co-2,2',5,5'-tetrakis(3,7-dimethyloctyloxy)stilbene-4,4'-diyl) (Polymeric fluorescent substance 1). The yield was 350 mg. The ratio of repeating units represented by the formulae (7) and (8) in Polymeric fluorescent substance 1 was 9:1 depending on monomer charging ratio.

Polymeric fluorescent substance 1 had a polystyrene-reduced number-average molecular weight of $1.3 \times 10^4$. Polymeric fluorescent substance 1 could be dissolved in a solvent such as toluene, chloroform and the like.

Evaluation of Fluorescent Property

A 0.4 wt % chloroform solution of Polymeric fluorescent substance 1 was spin-coated on quartz, to form a thin film of Polymeric fluorescent substance 1. The ultraviolet visible absorption spectrum and fluorescent spectrum of this thin film were measured by using a ultraviolet visible absorption spectrophotometer (UV3500 manufactured by Hitachi, Ltd.) and a fluorescent spectrophotometer (850 manufactured by Hitachi, Ltd.), respectively. For calculation of fluorescent strength, a fluorescent spectrum excited at 350 nm was used. The area of fluorescent spectra plotted against wave-number on the abscissa was divided by the absorption at 350 nm, to obtain a relative value of the fluorescent strength.

Polymeric fluorescent substance 1 has a fluorescent peak wave-length of 470 nm, and revealed a relative value of the fluorescent strength of 2.2.

Production and Evaluation of the Device

On a glass substrate on which an ITO film had been made at a thickness of 150 nm according to a sputtering method, a film having a thickness of 50 nm was formed using a solution (Baytron, manufactured by Bayer) of poly (ethylenedioxythiophene)/polystyrenesulfonic acid by spin coating, and the film was dried at 120° C. for 10 minutes on a hot plate. Then, a film having a thickness of about 70 nm was formed using a 1.5 wt % toluene solution of Polymeric fluorescent substance 1 by spin coating. Further, this film was dried at 80° C. for 1 hour under reduced pressure, then, lithium fluoride was vapor-deposited at 0.4 nm as a cathode buffer layer, calcium was vapor-deposited at 25 nm and aluminum was vapor-deposited at 40 nm as a cathode, to produce a polymer LED. In any vapor deposition, the degree of vacuum was 1 to $8 \times 10^{-6}$ Torr. Voltage was applied on the resulted device, to give EL light emission from Polymeric fluorescent substance 1. The strength of EL light emission was approximately in proportion to the current density.

Example 2

Poly(9,9-dioctylfluorene-2,7-diyl-co-2,2',5,5'-tetraki s(3,7-dimethyloctyloxy)stilbene-4,4'-diyl) (Polymeric fluorescent substance 2) was obtained in the same manner as in Example 1 except that 2,7-dibromo-9,9-dioctylfluorene and 4,4'-dibromo-2,2',5,5'-tetrakis(2,7-dimethyloctyloxy)stilbene were used at a molar ratio of 2:3. Polymeric fluorescent substance 2 contained repeating units represented by the formulae (7) and (8) copolymerized at a molar ratio of 7:3.

Evaluation of Fluorescent Property

The relative value of the fluorescent strength of Polymeric fluorescent substance 2 was obtained in the same manner as in Example 1.

Polymeric fluorescent substance 2 had a fluorescent peak wave-length of 470 nm and showed a relative value of the fluorescent strength of 1.9.

Example 3

Synthesis of 4,4'-bis(2-(4-bromophenyl)-2-phenyl-ethenyl)-biphenyl

Under an inert atmosphere, 4-bromobenzophenbne (0.783 g, 3 mmol) and 4,4'-bis-(diethylmethyl phosphonate)-biphenyl (0.559 g, 1.23 mmol) were added to and dissolved in tetrahydrofuran (10 g). At room temperature, a solution of tert-butoxypotassium (0.414 g, 3.69 mmol) in tetrahydrofuran (3.28 g) was added dropwise over 5 minutes. The mixture was stirred under this condition for 3.5 hours. The reaction mixture was added into water (100 ml) and the mixture was neutralized with 5% sulfuric acid. After neutralization, toluene (250 ml) was added to separate an organic layer. The organic layer was washed with water, and dried with anhydrous sodium sulfate. The solvent was distilled off under reduced pressure, and the resulted crude product was purified by silica gel chromatography, to obtain the intended substance. The yielded amount was 0.34 g and the yield was 41%.

Synthesis of Polymeric Fluorescent Substance 3

Under an inert atmosphere, 2,7-dibromo-9,9-dioctylfluorene (560 mg, 1.0 mmol), 4,4'-bis(2-(4-bromophenyl)-2-phenyl-ethenyl)-biphenyl (76 mg, 0.11 mmol) were dissolved in tetrahydrofuran (10 ml), and to this was added magnesium (55 mg, 2.3 mmol), nickel chloride (NiCl$_2$) (10 mg, 0.079 mmol) and bipyridyl (12 mg, 0.079 mmol), and the mixture was heated under reflux for 5 hours. After cooling, the reaction solution was added dropwise into methanol (100 ml), and the deposited precipitate was filtrated off. The resulted precipitate was dissolved in toluene, washed with dilute hydrochloric acid, then, washed with water until pH of the washing solution reached 7, then, the organic layer was distilled off under reduced pressure. The residue was dissolved in 20 ml of toluene, and re-precipitated from 100 ml of methanol, to give Polymeric fluorescent substance 3. The yielded amount was 238 mg. Polymeric fluorescent substance 3 contained repeating units represented by the following formulae (7) and (9) at a molar ratio of about 9:1, depending on the charging ratio of monomers.

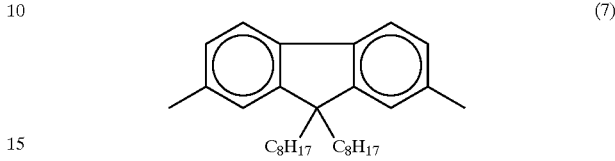

(7)

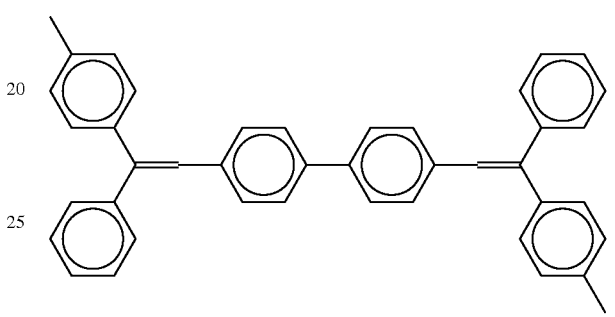

(8)

Polymeric fluorescent substance 3 had a polystyrene-reduced average molecular weight of Mw=26,400, Mn=8,800. Polymeric fluorescent substance 3 could be dissolved in a solvent such as toluene, chloroform and the like.

Evaluation of Fluorescent Property

The relative value of the fluorescent strength of Polymeric fluorescent substance 3 was obtained in the same manner as in Example 1.

Polymeric fluorescent substance 3 had a fluorescent peak wave-length of 476 nm and showed a relative value of the fluorescent strength of 4.2.

Production and Evaluation of the Device

Polymer LED was fabricated in the same manner as in Example 1 except for using polymeric fluorescent substance 3 in place of polymeric fluorescent substance 1. Voltage was applied on the resulted device, to give EL light emission from Polymeric fluorescent substance 3. The strength of EL light emission was approximately in proportion to the current density.

Example 4

Synthesis of Polymeric Fluorescent Substance 4

Polymeric fluorescent substance 4 was obtained in the same manner as in Example 3 except that 1,4-bis(2-(4-bromophenyl)-2-phenyl-ethenyl-2-(2-ethylhexyl oxy)-5-methoxybenzene was used instead of 4,4'-bis(2-(4-bromophenyl)-2-phenyl-ethenyl)-biphenyl. The yielded amount was 201 mg. Polymeric fluorescent substance 4 contained repeating units represented by the following formulae (7) and (10) at a molar ratio of about 9:1, depending on the charging ratio of monomers.

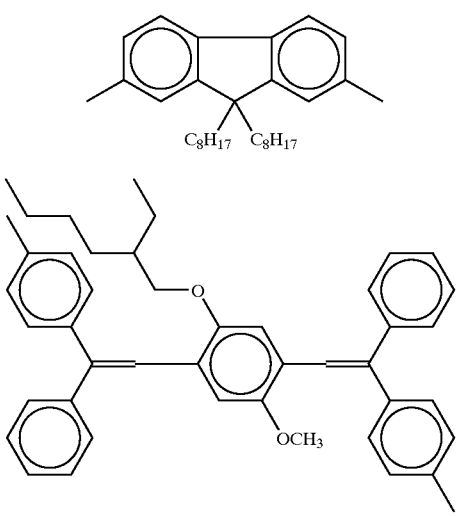

(7)

(10)

Polymeric fluorescent substance 4 had a polystyrene-reduced average molecular weight of Mw=25,600, Mn=8,400. Polymeric fluorescent substance 3 could be dissolved in a solvent such as toluene, chloroform and the like.

Evaluation of Fluorescent Property

The relative value of the fluorescent strength of Polymeric fluorescent substance 4 was obtained in the same manner as in Example 1.

Polymeric fluorescent substance 4 had a fluorescent peak wave-length of 504 nm and showed a relative value of the fluorescent strength of 2.9.

Production and Evaluation of the Device

Polymer LED was fabricated in the same manner as in Example 1 except for using polymeric fluorescent substance 4 in place of polymeric fluorescent substance 1. Voltage was applied on the resulted device, to give EL light emission from Polymeric fluorescent substance 4. The strength of EL light emission was approximately in proportion to the current density.

Example 5

Under an inert atmosphere, 2,7-dibromo-9,9-dioctylfluorene (560 mg, 1.0 mmol), 2,5-bis(2-(4-bromophenyl)-2-phenyl-ethenyl)-2-octyldimethy isilylbenzene (83 mg, 0.11 mmol) were dissolved in tetrahydrofuran (10 ml), and to this was added magnesium (53 mg, 2.2 mmol), nickel chloride (NiCl$_2$) (10 mg, 0.077 mmol) and bipyridyl (12 mg, 0.077 mmol), and the mixture was heated under reflux for 5 hours. After cooling, the reaction solution was added dropwise into methanol (100 ml), and the deposited precipitate was filtrated off. The resulted precipitate was dissolved in toluene, washed with dilute hydrochloric acid, then, washed with water, and dried under reduced pressure, to give Polymeric fluorescent substance 5. The yielded amount was 200 mg. Polymeric fluorescent substance 5 contained repeating units represented by the following formulae (7) and (11) at a molar ratio of about 9:1, depending on the charging ratio of monomers.

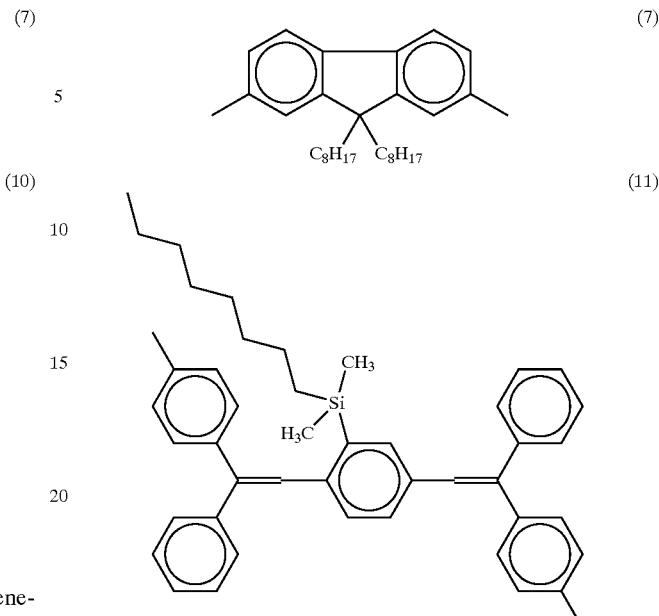

(7)

(11)

Polymeric fluorescent substance 5 had a polystyrene-reduced average molecular weight of Mw=13,600, Mn=5,900. Polymeric fluorescent substance 5 could be dissolved in a solvent such as toluene, chloroform and the like.

Evaluation of Fluorescent Property

The relative value of the fluorescent strength of Polymeric fluorescent substance 5 was obtained in the same manner as in Example 1.

Polymeric fluorescent substance 5 had a fluorescent peak wave-length of 486 nm and showed a relative value of the fluorescent strength of 3.5.

Production and Evaluation of the Device

Polymer LED was fabricated in the same manner as in Example 1 except for using polymeric fluorescent substance 5 in place of polymeric fluorescent substance 1. Voltage was applied on the resulted device, to give EL light emission from Polymeric fluorescent substance 5. The strength of EL light emission was approximately in proportion to the current density.

Example 6

Synthesis of Polymeric Fluorescent Substance 6

Under an inert atmosphere, 9,9-dioctylfluorene-2,7-bis (ethylene boronate) (314 mg, 0.59 mmol), 9,10-bis(2-(4-bromophenyl)-2-phenyl-ethenyl)-anthracene (390 mg, 0.56 mmol) and aliquat® 336 (manufactured by Aldrich, 220 mg, 0.55 mmol) were dissolved in toluene (10 ml) and to this was added 10 ml of an aqueous solution of potassium carbonate (290 mg, 2.1 mmol). Further, tetrakis(triphenylphosphine) palladium (21 mg, 0.018 mmol) was added, and the mixture was heated under reflux for 20 hours. After cooling,the organic layer was added dropwise into methanol, and the deposited precipitate was filtrated off. This was dissolved in toluene (100 ml), and washed with 3% oxalic acid water, then, water, and the organic layer was distilled off under reduced pressure. The residue was dissolved in toluene (20 ml) and added dropwise into methanol, and the deposited precipitate was filtrated off, to obtain Polymeric fluorescent substance 6. The yielded amount was 280 mg. Polymeric fluorescent substance 6 contained repeating units represented by the following formulae (7) and (12), bonded alternately, at a molar ratio of about 1:1, depending on the charging ratio of monomers.

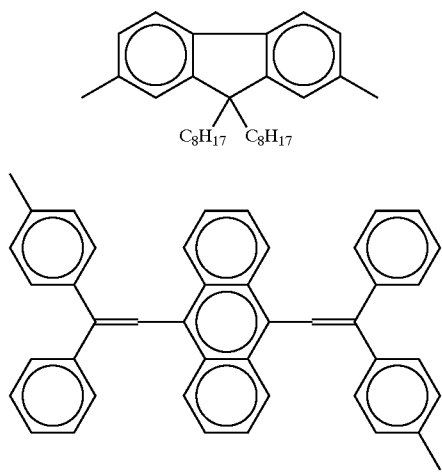

(7)

(12)

Polymeric fluorescent substance 6 hadapolystyrene-reduced average molecular weight of Mw=22,000, Mn=8, 800. Polymeric fluorescent substance 6 could be dissolved in a solvent such as toluene, chloroform and the like.

Evaluation of Fluorescent Property

The relative value of the fluorescent strength of Polymeric fluorescent substance 6 was obtained in the same manner as in Example 1.

Polymeric fluorescent substance 6 had a fluorescent peak wave-length of 548 nm and showed a relative value of the fluorescent strength of 0.41.

Example 7

Synthesis of Polymeric Fluorescent Substance 7

Polymeric fluorescent substance 7 was obtained in the same manner as in Example 4 except that 1,4-bis(2-(4-bromophenyl)-2-phenyl-ethenyl-2-methyl-5-(3,7-dimethyloctyl)benzene was used instead of 9,10-bis(2-(4-bromophenyl)-2-phenyl-ethenyl)-anthracene. The yielded amount was 220 mg. Polymeric fluorescent substance 7 contained repeating units represented by the following formulae (7) and (13), bonded alternately, at a molar ratio of about 1:1, depending on the charging ratio of monomers.

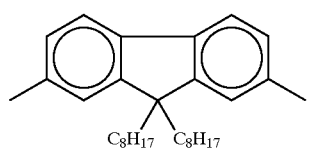

(7)

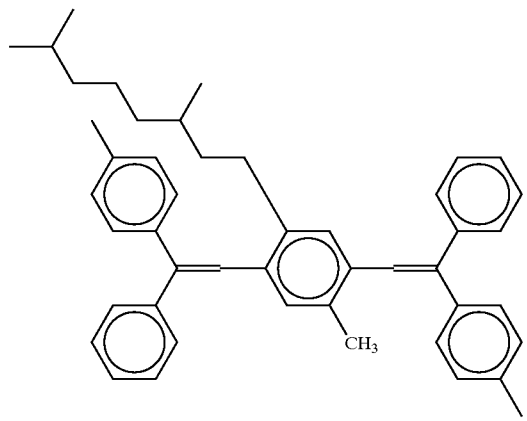

(13)

Polymeric fluorescent substance 7 had a polystyrene-reduced average molecular weight of Mw=26,100, Mn=10, 700. Polymeric fluorescent substance 7 could be dissolved in a solvent such as toluene, chloroform and the like.

Evaluation of Fluorescent Property

The relative value of the fluorescent strength of Polymeric fluorescent substance 7 was obtained in the same manner as in Example 1.

Polymeric fluorescent substance 7 had a fluorescent peak wave-length of 496 nm and showed a relative value of the fluorescent strength of 2.2.

Example 8

Synthesis of Polymeric Fluorescent Substance 8

Under an inert atmosphere, 9,19-dioctylfluorene-2,7-bis (ethylene boronate) (305 mg, 0.57 mmol), 1,4-bis(2-(4-bromophenyl)-2-phenyl-ethenyl)-2-(4-(3,7-dimethyloctyloxy)-phenyl)benzene (451 mg, 0.547 mmol) and aliquat® 336 (manufactured by Aldrich, 220 mg, 0.547 mmol) were dissolved in toluene (10 ml) and to this was added 10 ml of an aqueous solution of potassium carbonate (226 mg, 1.64 mmol). Further, tetrakis (triphenylphosphine) palladium (1.3 mg, 0.001 mmol) was added, and the mixture was heated under reflux for 10 hours. After cooling, the organic layer was added dropwise into methanol, and the deposited precipitate was filtrated off, to obtain Polymeric fluorescent substance 8. The yielded amount was 280 mg. Polymeric fluorescent substance 8 contained repeating units represented by the following formulae (7) and (14), bonded alternately, at a molar ratio of about 1:1, depending on the charging ratio of monomers.

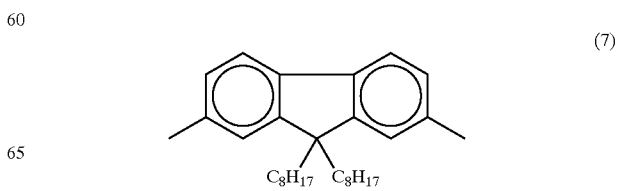

(7)

-continued (14)

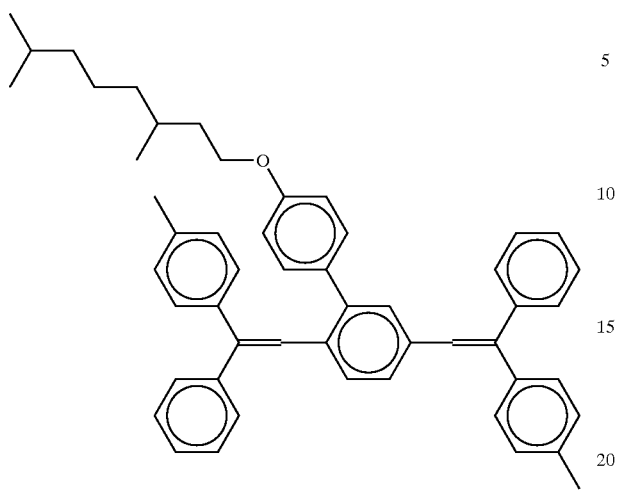

Evaluation of Fluorescent Property

The relative value of the fluorescent strength of Polymeric fluorescent substance 8 was obtained in the same manner as in Example 1.

Polymeric fluorescent substance 8 had a fluorescent peak wave-length of 473 nm and showed a relative value of the fluorescent strength of 2.2.

Comparative Example 1

Synthesis of 1,4-bis(2-(4-bromophenyl)ethenyl)-4'-(3,7-dimethyloctyloxy)biphenyl Under an inert atmosphere, 4-bromobenzaldehyde (2.18 g, 11.8 mmol), 2,5'-bis-(diethylmethyl phosphonate)-4'-(3,7-dimethyloctyloxy)biphenyl (3.0 g, 5.0 mmol) and tert-butoxypotassium (2.0 g, 1.76 mmol) were added to and dissolved in tetrahydrofuran (30 g), and the solution was stirred for 3 hours. The solvent was distilled off, and the residue was dissolved in toluene (200 ml), and hydrochloric acid water (200 ml) was added. After liquid separation, the aqueous layer was extracted with toluene (100 ml). The organic layer was combined with this and was with water twice, then, filtrated through Celite®(manufactured by Aldrich). The organic layer was dried over molecular sieves, then, the solvent was distilled off. The resulted crude product was purified by silica gel column chromatography (hexane/toluene), to obtain the intended substance. The yielded amount was 1.36 g, and the yield was 41%.

Synthesis of Polymeric Fluorescent Substance 8

Under an inert atmosphere, 9,9-dioctylfluorene-2,7-bis (ethylene boronate) (185 mg, 0.35 mmol), 1,4-bis(2-(4-bromophenyl)ethenyl-4'-(3,7-dimethyloctyloxy) biphenyl (223 mg, 0.33 mmol) and aliquat® 336 (manufactured by Aldrich, 17 mg, 0.042 mmol) were dissolved in toluene (2.7 g) and to this was added 8 ml of an aqueous solution of potassium carbonate (1.13 g, 8.1 mmol). Further, tetrakis (triphenylphosphine)palladium (2 mg, 0.0017 mmol) was added, and the mixture was heated under reflux for 10 hours. After cooling, the organic layer was added dropwise into methanol/water (1/1). The supernatant was discarded, and methanol was added to the residue and suspended. The precipitate was filtrated off, to obtain Polymeric fluorescent substance 9. The yielded amount was 290 mg. Polymeric fluorescent substance 9 contained repeating units represented by the following formulae (7) and (15), bonded alternately, at a molar ratio of about 1:1, depending on the charging ratio of monomers.

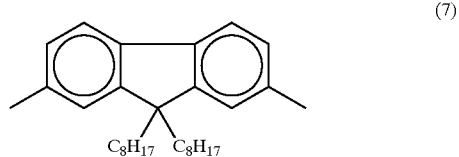

(7)

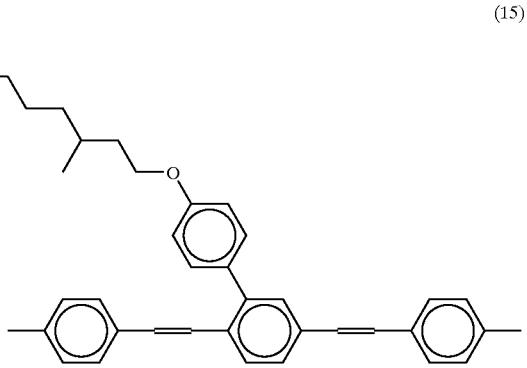

(15)

Evaluation of Fluorescent Property

The relative value of the fluorescent strength of Polymeric fluorescent substance 9 was obtained in the same manner as in Example 1.

Polymeric fluorescent substance 9 had a fluorescent peak wave-length of 468 nm and showed a relative value of the fluorescent strength of 0.27.

The polymeric fluorescent substance of the present invention contains an arylenevinylene structure and a fluorene structure, shows strong fluorescence, and can be suitably used as a polymer LED or a pigment for laser. The polyfluorene-based polymeric fluorescent substance of the present invention can also be used as an organic solar battery material, organic semiconductor for organic transistor, and conductive thin film material. Further, a polymer LED using this polymeric fluorescent substance is a polymer LED of high performance which can be driven at lower voltage with high efficiency. Therefore, this polymer LED can be preferably used as a back light of a liquid crystal display, a light source in the form of curved surface or flat surface for illumination, or a display device of segment type, and in apparatuses such as a flat panel display of dot matrix, and the like.

What is claimed is:

1. A polymeric fluorescent substance manifesting fluorescence in solid state and having a polystyrene-reduced number-average molecular weight of $10^3$ to $10^8$ wherein the polymeric fluorescent substance contains one or more of segments represented by the following formula (1) and one or more of repeating units represented by the following formula (2):

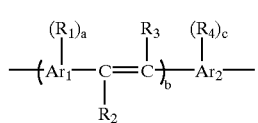

(1)

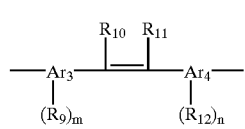

(3)

in the formula, $Ar_1$ and $Ar_2$ each independently represent an arylene group or a divalent heterocyclic compound group; $R_2$ and $R_3$ each independently represent a group selected from the group consisting of a hydrogen atom, alkyl groups, aryl groups, heterocyclic compound groups and cyano group; $R_1$ and $R_4$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, arylalkenyl groups, arylalkinyl groups, monovalent heterocyclic compound groups and cyano group; a and c each independently represent an integer of 0 to 4, and b represents an integer of 1 or more; when b is 1, a and c do not represent 0 simultaneously; when b is 2, at least one of groups $R_2$ and $R_3$ represents a group other than a hydrogen atom and cyano group; when b is 3 or more, a and c do not represent 0 simultaneously if both of $R_2$ and $R_3$ are a hydrogen atom; when a is 2 or more, a plurality of $R_1$s may be the same or different; when c is 2 or more, a plurality of $R_4$s may be the same or different; $R_1$ to $R_4$ may be connected to form a ring; and when $R_1$ to $R_4$ are a group containing an alkyl chain, one or more of a methyl group, methylene group and methine group constituting this alkyl chain may be substituted with a group containing a hetero atom,

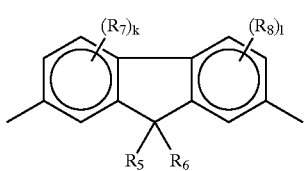

(2)

in the formula, $R_5$ and $R_6$ each independently represent a group selected from the group consisting of a hydrogen atom, alkyl groups, aryl groups and monovalent heterocyclic compound groups; $R_7$ and $R_8$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, monovalent heterocyclic compound groups and cyano group; k and l each independently represent an integer of 0 to 3; when k is 2 or more, a plurality of $R_7$s may be the same or different; when l is 2 or more, a plurality of $R_8$s may be the same or different; two or more of $R_5$ to $R_8$ may be mutually connected to form a ring; and when $R_5$ to $R_8$ are a group containing an alkyl chain, this alkyl chain may be interrupted with a group containing a hetero atom.

2. A polymeric fluorescent substance manifesting fluorescence in solid state and having a polystyrene-reduced number-average molecular weight of $10^3$ to $10^8$ wherein the polymeric fluorescent substance contains one or more of repeating units represented by the formula (2) and one or more of repeating units represented by the following formula (3):

in the formula, $Ar_3$ and $Ar_4$ each independently represent an arylene group or a divalent heterocyclic compound group; $R_{10}$ and $R_{11}$ each independently represent a group selected from the group consisting of a hydrogen atom, alkyl groups, aryl groups, monovalent heterocyclic compound groups and cyano group; $R_9$ and $R_{12}$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, arylalkenyl groups, arylalkinyl groups, heterocyclic compound groups and cyano group; m and n each independently represent an integer of 0 to 4; m and n do not represent 0 simultaneously; when m is 2 or more, a plurality of $R_9$s may be the same or different; when n is 2 or more, a plurality of $R_{12}$s may be the same or different; $R_9$ to $R_{12}$ may be connected to form a ring; and when $R_9$ to $R_{12}$ are a group containing an alkyl chain, one or more of a methyl group, methylene group and methine group constituting this alkyl chain may be substituted with a group containing a hetero atom.

3. The polymeric fluorescent substance according to claim 2 wherein the total amount of repeating units represented by the formulae (2) and (3) is 50 mol % or more based on the total amount of all repeating units, and the total amount of repeating units represented by the formula (3) is 0.1 mol % or more and 50 mol % or less based on the total amount of the repeating units represented by the formulae (2) and (3).

4. The polymeric fluorescent substance according to claim 3 wherein the group represented by the formula (3) is a group represented by the following formula (4)

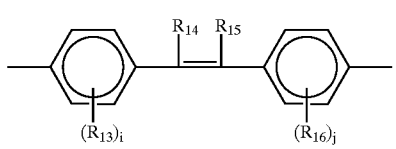

(4)

in the formula, $R_{14}$ and $R_{15}$ each independently represent a group selected from the group consisting of a hydrogen atom, alkyl groups, aryl groups, heterocyclic compound groups and cyano group; $R_{13}$ and $R_{16}$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, monovalent heterocyclic compound groups and cyano group; i and j each independently represent an integer of 0 to 4; i and j do not represent 0 simultaneously; when i is 2 or more, a plurality of $R_{13}$s may be the same or different; when j is 2 or more, a plurality of $R_{16}$s may be the same or different; and $R_{13}$ to $R_{16}$ may be connected to form a ring.

5. A polymeric fluorescent substance manifesting fluorescence in solid state and having a polystyrene-reduced number-average molecular weight of $10^3$ to $10^8$ wherein the polymeric fluorescent substance contains one or more of repeating units represented by the formula (2) and one or more of repeating units represented by the following formula (5):

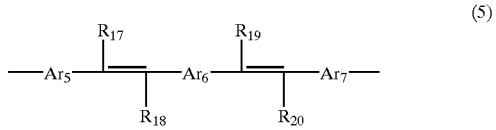

in the formula, $Ar_5$, $Ar_6$ and $Ar_7$ each independently represent an arylene group or a divalent heterocyclic compound group; $R_{17}$ and $R_{20}$ each independently represent a group selected from the group consisting of a hydrogen atom, alkyl groups, aryl groups, monovalent heterocyclic compound groups and cyano group. One or more of $R_{17}$ and $R_{20}$ represent a group other than a hydrogen atom and cyano group; two or more of $R_{17}$ and $R_{20}$ may be mutually connected to form a ring; and when $R_{17}$ to $R_{20}$ are a group containing an alkyl chain, this alkyl chain may be interrupted with a group containing a hetero atom.

6. The polymeric fluorescent substance according to claim 5 wherein the total amount of repeating units represented by the formulae (2) and (5) is 50 mo % or more based on the total amount of all repeating units, and the total amount of repeating units represented by the formula (5) is 0.1 mol % or more and 50 mol % or less based on the total amount of the repeating units represented by the formulae (2) and (5).

7. The polymeric fluorescent substance according to claim 6 wherein the group represented by the formula (5) is a group represented by the following formula (6)

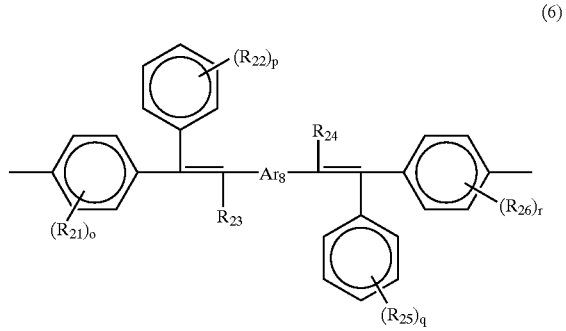

in the formula, $Ar_8$ represents an arylene group or a divalent heterocyclic compound group; $R_{23}$ and $R_{24}$ each independently represent a group selected from the group consisting of a hydrogen atom, alkyl groups, aryl groups, monovalent heterocyclic compound groups and cyano group; $R_{21}$, $R_{22}$, $R_{25}$ and $R_{26}$ each independently represent a group selected from the group consisting of alkyl groups, alkoxy groups, alkylthio groups, alkylsilyl groups, alkylamino groups, aryl groups, aryloxy groups, arylsilyl groups, arylamino groups, arylalkyl groups, arylalkoxy groups, arylalkylsilyl groups, arylalkylamino groups, monovalent heterocyclic compound groups and cyano group. o and r each independently represent an integer of 0 to 4, and p and q each independently represent an integer of 0 to 5; when o is 2 or more, a plurality of $R_{21}$s may be the same or different; when p is 2 or more, a plurality of $R_{32}$s may be the same or different; when q is 2 or more, a plurality of $R_{25}$s may be the same or different; when r is 2 or more, a plurality of $R_{26}$S may be the same or different; two or more of $R_{21}$ and $R_{26}$ may be mutually connected to form a ring; and when $R_{21}$ to $R_{26}$ are a group containing an alkyl chain, this alkyl group may be interrupted with a group containing a hetero atom.

8. A polymer light emitting device comprising at least a light emitting layer between a pair of electrodes composed of an anode and a cathode at least one of which is transparent or semi-transparent wherein the light emitting layer contains a polymeric fluorescent substance according to any of claims 1 to 7.

9. The polymer light emitting device according to claim 8, further comprising a layer containing an conducting polymer disposed between one electrode and the light emitting layer so that the layer containing an conducting polymer is adjacent to said electrode.

10. The polymer light emitting device according to claim 8, further comprising an insulation layer having a thickness of 2 nm or less disposed between one electrode and the light emitting layer so that the insulation layer is adjacent to said electrode.

11. The polymer light emitting device according to claim 8, further comprising a layer comprising an electron transporting compound disposed between the cathode and the light emitting layer so that the layer comprising an electron transporting compound is adjacent to said light emitting layer.

12. The polymer light emitting device according to claim 8, further comprising a layer comprising a hole transporting compound disposed between the anode and the light emitting layer so that the layer comprising a hole transporting compound is adjacent to said light emitting layer.

13. The polymer light emitting device according to claim 8, further comprising a layer comprising an electron transporting compound and a layer comprising a hole transporting compound disposed between the cathode and the light emitting layer so that the layer comprising an electron transporting compound is adjacent to said light emitting layer, and the layer comprising a hole transporting compound is adjacent to said light emitting layer.

14. A flat light source obtained by using the polymer light emitting device of claim 8.

15. A segment display obtained by using the polymer light emitting device of claim 8.

16. A dot matrix display obtained by using the polymer light emitting device of claim 8.

17. A liquid crystal display obtained by using the polymer light emitting device of claim 8 as a back-light.

18. The polymer light emitting device according to claim 9, further comprising a layer comprising an electron transporting compound disposed between the cathode and the light emitting layer so that the layer comprising an electron transporting compound is adjacent to said light emitting layer.

19. The polymer light emitting device according to claim 10, further comprising a layer comprising an electron transporting compound disposed between the cathode and the light emitting layer so that the layer comprising an electron transporting compound is adjacent to said light emitting layer.

20. The polymer light emitting device according to claim 9, further comprising a layer comprising a hole transporting compound disposed between the anode and the light emitting layer so that the layer comprising a hole transporting compound is adjacent to said light emitting layer.

21. The polymer light emitting device according to claim 10, further comprising a layer comprising a hole transporting compound disposed between the anode and the light emitting layer so that the layer comprising a hole transporting compound is adjacent to said light emitting layer.

22. The polymer light emitting device according to claim 9, further comprising a layer comprising an electron transporting compound and a layer comprising a hole transporting compound disposed between the cathode and the light emitting layer so that the layer comprising an electron transporting compound is adjacent to said light emitting layer, and the layer comprising a hole transporting compound is adjacent to said light emitting layer.

23. The polymer light emitting device according to claim 10, further comprising a layer comprising an electron transporting compound and a layer comprising a hole transporting compound disposed between the cathode and the light emitting layer so that the layer comprising an electron transporting compound is adjacent to said light emitting layer, and the layer comprising a hole transporting compound is adjacent to said light emitting layer.

24. A flat light source obtained by using the polymer light emitting device of claim 9.

25. A flat light source obtained by using the polymer light emitting device of claim 10.

26. A flat light source obtained by using the polymer light emitting device of claim 11.

27. A flat light source obtained by using the polymer light emitting device of claim 12.

28. A flat light source obtained by using the polymer light emitting device of claim 13.

29. A segment display obtained by using the polymer light emitting device of claim 9.

30. A segment display obtained by using the polymer light emitting device of claim 10.

31. A segment display obtained by using the polymer light emitting device of claim 11.

32. A segment display obtained by using the polymer light emitting device of claim 12.

33. A segment display obtained by using the polymer light emitting device of claim 13.

34. A dot matrix display obtained by using the polymer light emitting device of claim 9.

35. A dot matrix display obtained by using the polymer light emitting device of claim 10.

36. A dot matrix display obtained by using the polymer light emitting device of claim 11.

37. A dot matrix display obtained by using the polymer light emitting device of claim 12.

38. A dot matrix display obtained by using the polymer light emitting device of claim 13.

39. A liquid crystal display obtained by using the polymer light emitting device of claim 9 as a back-light.

40. A liquid crystal display obtained by using the polymer light emitting device of claim 10 as a back-light.

41. A liquid crystal display obtained by using the polymer light emitting device of claim 11 as a back-light.

42. A liquid crystal display obtained by using the polymer light emitting device of claim 12 as a back-light.

43. A liquid crystal display obtained by using the polymer light emitting device of claim 13 as a back-light.

\* \* \* \* \*